United States Patent

[11] 3,594,637

[72] Inventor Robert W. Beckwith
 1002 Greenfield Lane, Mount Prospect, Ill. 60056
[21] Appl. No. 741,599
[22] Filed July 1, 1968
[45] Patented July 20, 1971

[54] VARIABLE-PHASE POWER FREQUENCY GENERATOR-AMPLIFIER
 11 Claims, 9 Drawing Figs.
[52] U.S. Cl. ................................................. 324/83 R, 324/78 R, 331/59
[51] Int. Cl. .................................................. G01r 25/00, H03b 5/24
[50] Field of Search .......................................... 324/83 A, 78, 140, 73; 331/58, 59; 328/155; 325/363; 307/262, 271

[56] References Cited
UNITED STATES PATENTS
2,732,491 1/1956 Jeannot ........................ 331/59
3,281,846 10/1966 King ............................. 324/140
3,228,235 1/1966 Thomas ........................ 331/59 X Primary Examiner—Alfred E. Smith
Attorney—Stone, Zummer and Livingston ABSTRACT: The disclosure relates to a power frequency generator-amplifier and solid-state circuitry and equipment affording test apparatus of highly compact, stable and versatile character adapted for use in either rack-mounting or portable embodiments, and capable of performance in selectable operating modes to effect a variety of tests and functions of particular interest to workers in the electric utilities field involving power frequencies in the 45 to 65 Hz. range commonly employed for power distribution and to function (among other capabilities) as a variable power and frequency generator, a phase meter and phase rotator and comparator and as a highly stable, linear power source and amplifier useful in testing and adjusting voltage, phase and frequency-sensitive equipment.

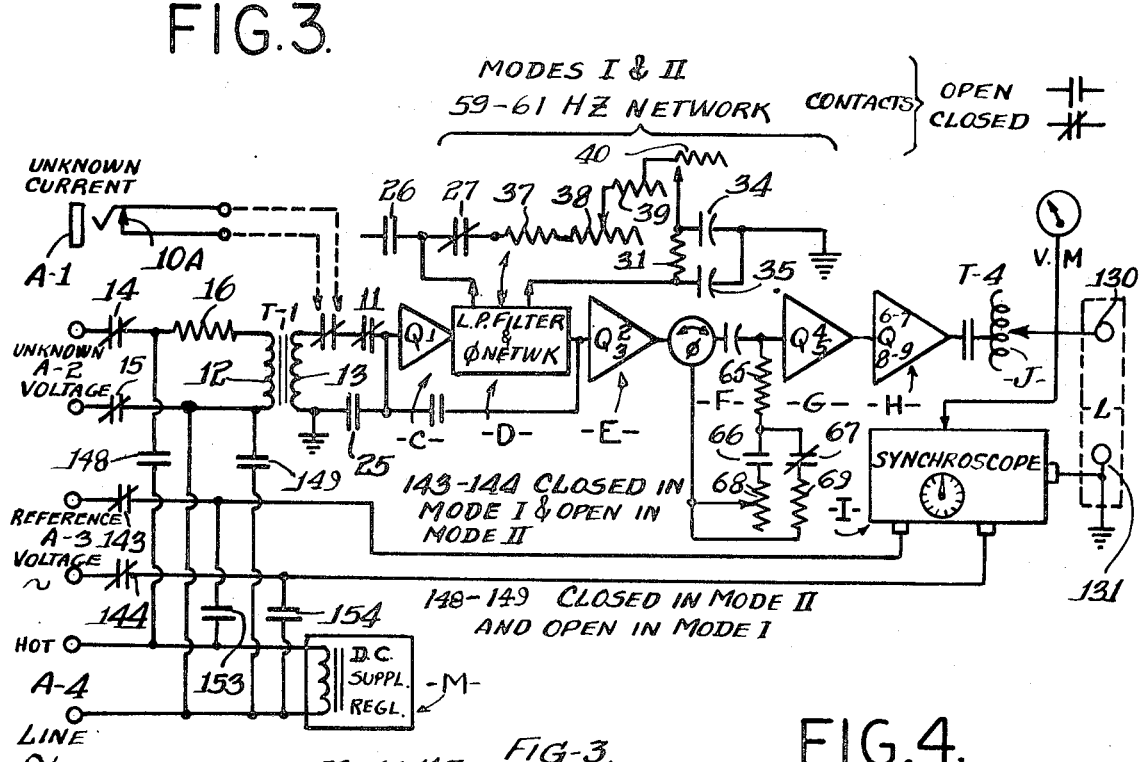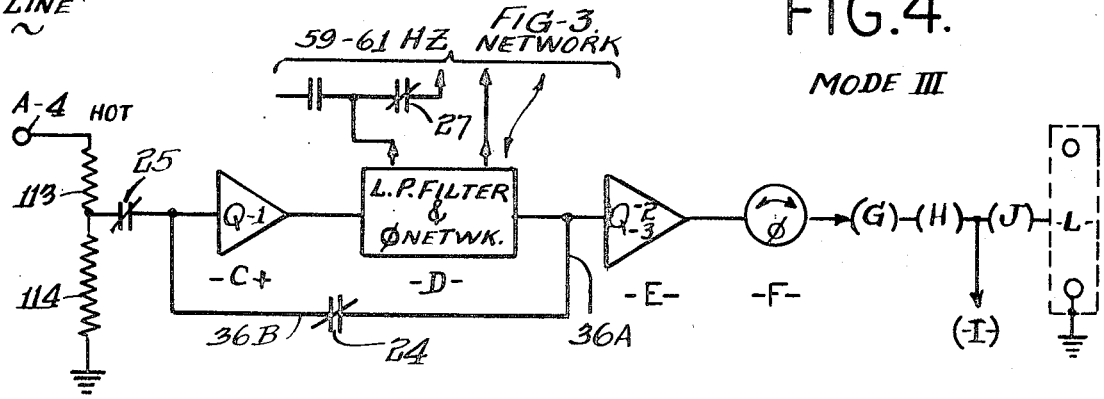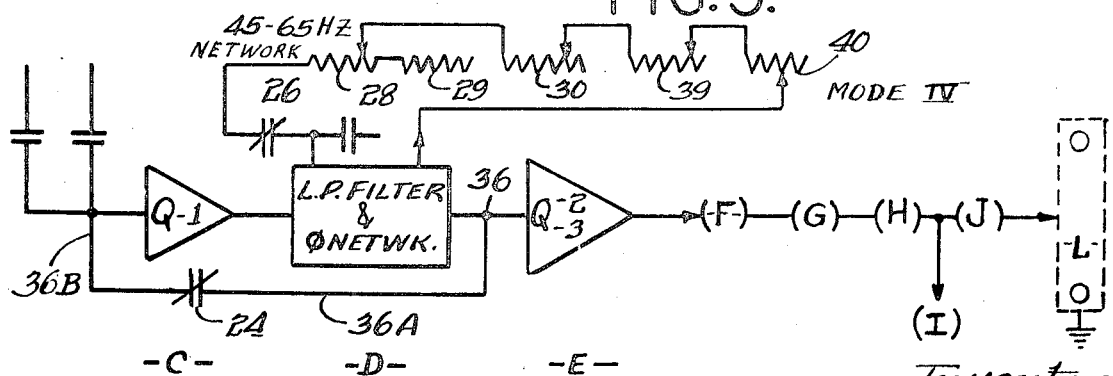

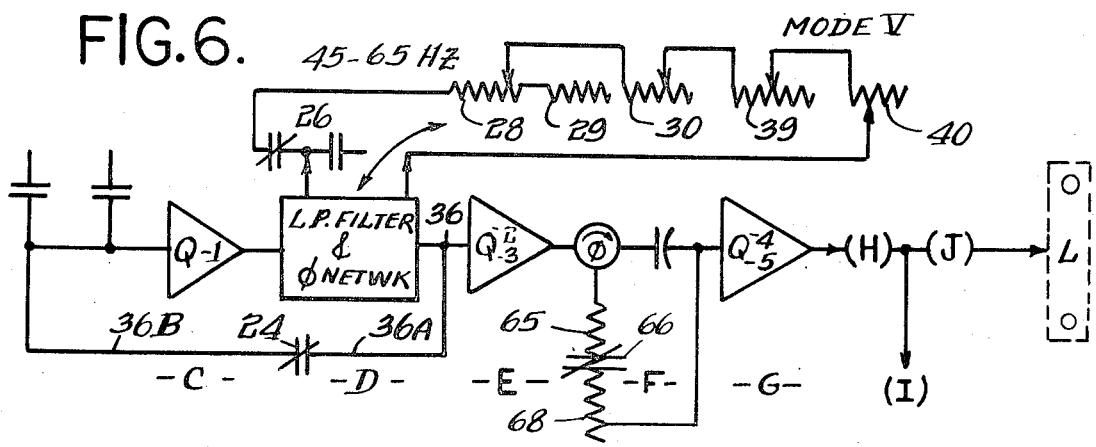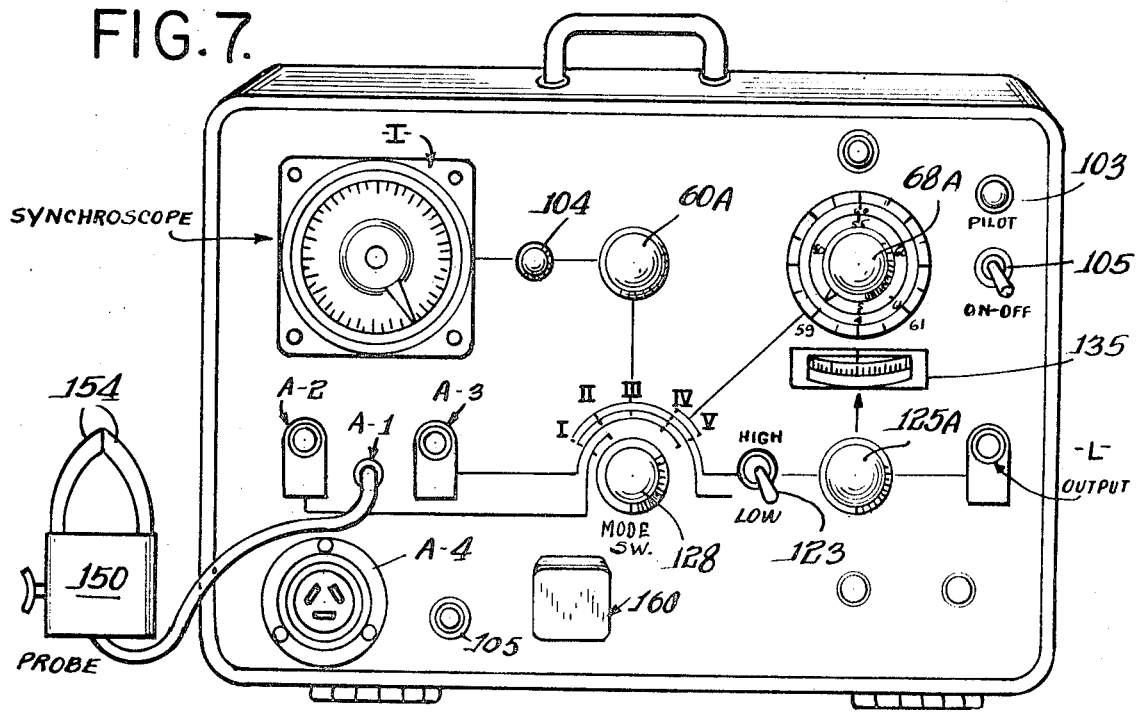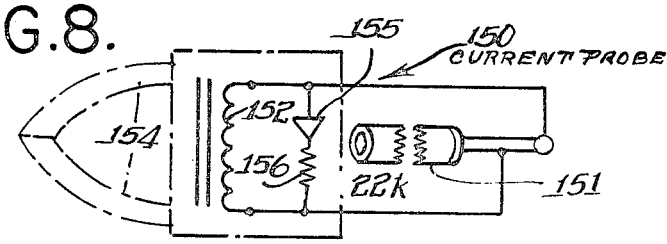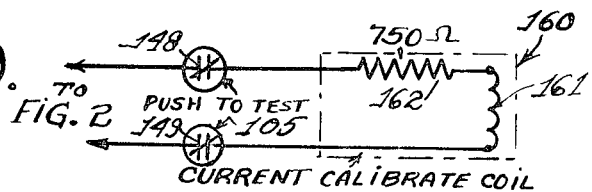

VARIABLE-PHASE POWER FREQUENCY GENERATOR-AMPLIFIER

In the electric power utilities field, installation, testing and maintenance procedures require the use of variable-frequency power and voltage sources, phase and power factor meters, phase-shifting devices for adjusting relays, calibrating frequency and watt recorders, transducers, meters and the like, and means for checking synchronization, phase angles and unknown voltage and current conditions.

The equipment heretofore available for such purposes has, in general, been costly, unwieldy in size and weight and usually encumbered by heavy transformer-type phase-shifting devices requiring a multiphase reference source, together with special test jigs and setups adapted to perform only a single function, and all of a character precluding any practical portability and any such versatility as distinguishes the apparatus hereinafter disclosed.

In some of its more detailed aspects, the apparatus comprises, in combination with selectable input circuits to which unknown voltages, currents and frequency sources may be connected, a plurality of subcircuits including a solid-state square wave oscillator and amplifier means; a combination low-pass filter and phase-shifting network; a highly compact 360°-phase rotating and slewing means; a novel solid-state, full-wave linear amplifier utilizing transformers and transistors operating without biasing networks in an emitter-follower configuration to yield high output power with high efficiency and stability, together with other circuit components and switching means for establishing interconnection of said subcircuits in at least five principal operating modes, all as more specifically set out in the following description of a preferred embodiment of the apparatus in conjunction with the annexed drawings in which:

FIG. 3 is a functional schematic illustrative of switching modes I and II;

FIGS. 4, 5 and 6 are further functional schematics illustrative, respectively, of switching modes III, IV and V;

FIG. 7 is a front elevational view of the control panel and carrying case (with cover removed) in a portable embodiment of the apparatus;

FIG. 8 is a schematic detail of the current probe;

FIG. 9 is a schematic detail of the current-calibrating coil.

Figure 1:
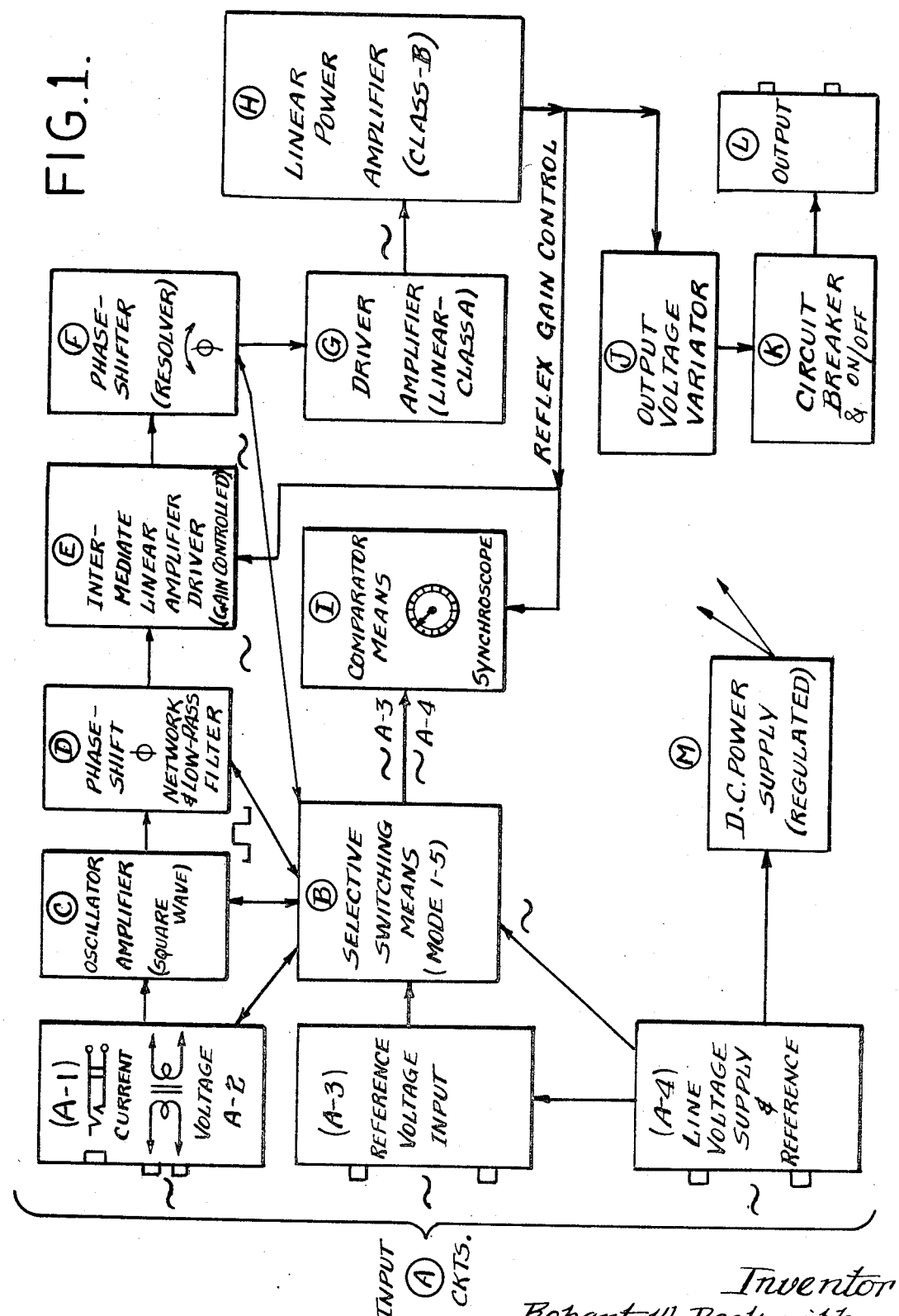
FIG. 1 is a block diagram illustrative of the general organization of the subcircuits and equipment.

The general character and organization of the subcircuits and associated equipment is first illustrated by block diagrams in FIG. 1 wherein Input Circuits, generally indicated at -A-, include four nominal inputs A-1, -2, -3, and -4 adapted for connection, in the case of inputs A-1 and A-2, to unknown currents and unknown voltages, respectively, for purposes such as the determination of frequency, phase angle and power factor; and in the case of input A-3, for connection with some standard or known reference voltage or frequency within the special "utilities" band contemplated, namely, 45 to 65 Hz.; and in the case of input A-4, for connection to the usual utilities service lines to establish a reference source of line voltage and frequency, and also to energize a local DC power supply.

With continuing reference to the block diagrams of FIG. 1, a selective switching means -B- is operative through the switching contacts referred to in the detailed circuitry to establish connections for performance of the apparatus in the five principal operating modes most often required, as by interconnecting various test input circuits with appropriate subcircuits comprising, as designated in FIG. 1 (and also in FIG. 2) a combination input and squaring amplifier and oscillator -C-; a phase shift network -D-; intermediate amplifier means -E- for driving a phase-shifting resolver means -F-; a power amplifier driver -G-; a linear power output amplifier -H-; comparator means, such as a synchroscope -I-; power variator means -J-; automatic circuit breaker means -K-; output terminal means -L-; and a regulated DC power supply means -M-.

As will appear hereafter in the detailed description, operating modes I and II relate to phase measurements using either the line voltage as a reference or some other external reference voltages or frequencies, mode II being intended to cover the 45 to 65 Hz. range for similar measurements. In mode III, an output at the line or supply frequency can be rotated in phase through 360° and very rapidly slewed to any angle of especial interest.

The phase shift network -D- serves as a low-pass filter in modes I to III, and as a 180° phase-shifting means for feedback to the oscillator which is effective in modes IV and V, the oscillator operating in either of two frequency ranges, one, a narrowed vernier range between 59 and 61 Hz., and the other a broader range covering 45 to 65 Hz. Further, in mode IV the phase rotation between the supply and output frequency may be displayed by means such as a synchroscope designated as the "Comparator Means" -I- in FIGS. 1 and 2.

Figure 2:
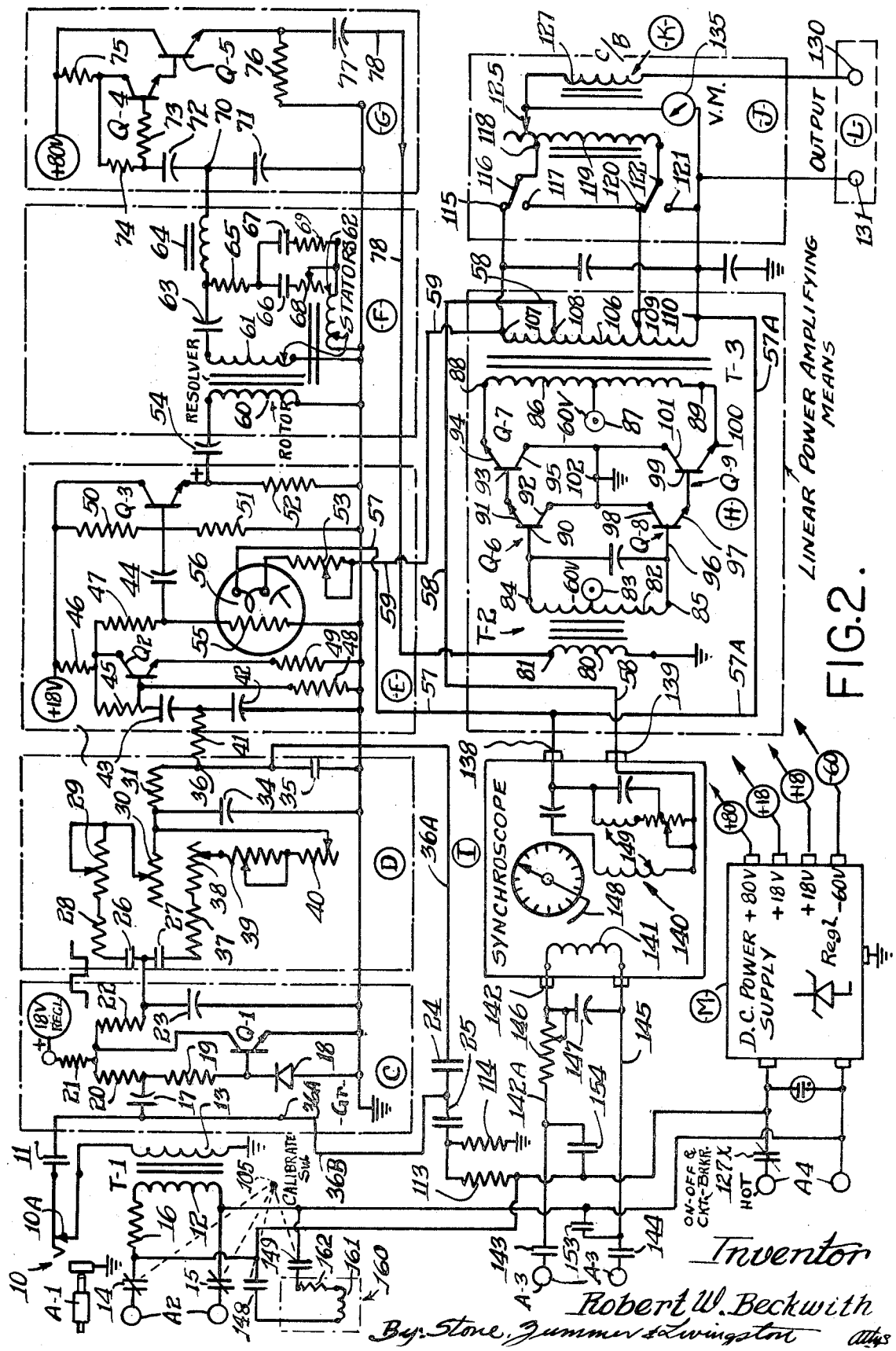
FIG. 2 is a comprehensive circuit diagram.

According to a preferred embodiment of the circuitry as depicted in FIG. 2, nominal input A-1 is a normally closed circuit jack 10, the normal contacts 10A of which are in series through switching contacts 11 with the secondary 13 of an input transformer T-1, the primary 12 of which connects through switching contacts 14 and 15 to input terminals A-2 to which an unknown input voltage may be connected when switching contacts 14 and 15 are closed, the jack 10 being used for measurement of unknown currents with the aid of a "clip-on" current-responsive probe described more particularly hereafter in view of FIG. 8.

Unknown voltages connected to input A-2 are applied to the primary 12 of the input transformer through a limiting resistance means 16 which may have a value from 100,000 ohms to 1 megohm, the upper value being adopted for the majority of applications in the utilities field, which will generally involve input voltages ranging from 15 to 350 volts (rms), owing to the limiting action of the saturation-operated input-amplifying means in modes I and II, in both of which the unknown input voltage acts through the input subcircuit -C-, which performs as a squaring amplifier, and thence through all or less than all of the following principal associated subcircuits -D- through -H-, depending upon the switching pattern selected and the character of test involved, it being observed again that in modes I and II the apparatus may function to measure voltage, frequency, or phase angle, or it may serve as a variable-phase source or phase meter or power factor indicator relative to some special input applied to input terminals A-3 in the 45 to 65 Hz. range, or relative to the line source derived from the reference input A-4, as will appear more fully hereafter.

In modes I and II, the input signal is coupled to the input amplifier -C- through capacitor means 17 to actuate a transistor Q-1 in the switching mode, turning it on to full saturation so that above threshold the output voltage is rendered independent of the input voltage, in consequence of which a significant limiting action is achieved, and under such operating conditions the output of this amplifier will have a square waveform. A diode 18 is employed in the input circuit of Q-1 to prevent damage from high negative inverse voltages.

Subcircuit -C- thus comprises transistor Q-1, coupling capacitor 17, protective diode 18, bias resistors 19, 20, limiting resistor 21 and a load resistor 22 and capacitor 23, all connected in a configuration such as depicted in FIG. 2 and having parameters for operation of transistor Q-1 in the saturation or switching mode, as aforesaid, in which it acts as a squaring amplifier of signals from the input circuit A-2, for example, or as an oscillator under control of overdriving feedback pulses from a succeeding combination phase shift and low-pass filter network in subcircuit -D-, as when switching contacts 24 are closed in modes IV and V, the feedback being derived at connection 36 at the output load resistor 41 for said network, and applied via conductor 36A, said contacts 24 closed, and conductor 36B to the aforesaid coupling capacitor 17 at the input of Q-1.

A nominal bias voltage means for Q-1 is provided by the resistors 19 and 20, the parameters of which place such bias at a level which precludes both cutoff and complete saturation from this source alone, in order to assure automatic starting and sustained oscillation, the expression "nominal bias" being thus adopted to signify an applied constant local bias, as such, in distinction to any additional biasing effects from other sources, such as the signal source or feedback source. Resistors 19 and 20 have the further function of bleeding off the charge on capacitor 17 so that the average DC bias will be maintained to assure cutoff in the amplifying mode.

Accordingly, transistor Q-1 is only partially biased toward turn-on by its nominal, local bias provided by resistors 19 and 20; and a supplemental bias voltage is supplied either by the applied input signals in the amplifying mode, or by feedback from subcircuit -D- in the oscillating mode, in magnitude sufficient to support oscillation, the nominal bias never being permitted to reach a level which could either cut off the transistor or sustain saturation in the absence of such supplemental or overdrive bias, whereby the average DC bias is maintained in both amplifying and oscillating modes of operation and the oscillator is made self-starting by its own noise energy.

The foregoing methods and circuitry for achieving both a limiting amplifying and oscillation action of the type described are considered unique in that the transistor means Q-1, for example, is forced to operate consistently in the switching mode by being overdriven by the combined nominal and superimposed or supplemental bias derived, selectively as in the illustrative embodiment, from the unknown input signal or from voltage fed back in proper phase from a following subcircuit having, in this case, the further function of converting the square wave form from the amplifier-oscillator means to a sine wave essential for operation of other components in associated subcircuits, as will more fully appear hereinafter.

Among the important advantages arising from the foregoing methods and circuit means, are the achievement of a voltage or amplitude-limiting action which makes the output level independent of the amplitude of the input signals beyond the minimal or threshold values necessary to initiate the conductive response of the transistor in both amplifying and oscillating operations, together with the fact that the output of Q-1 is made independent of temperature, which would otherwise adversely affect the stability of the entire system if the transistor were operated linearly, for example, and not at the same time guarded by one of the conventional stabilizing arrangements commonly required in the usual practice. It may be observed also that the disclosed methods differ from vacuum tube practice in the respect that there is sufficient nonlinearity in tubes to choke off the tendency to build up toward saturation.

Although it is essentially a low-pass filter, subcircuit -D- is designated in part as a phase shift network for the reason that it not only restores a sinusoidal waveform to the square wave output of circuit -C-, but effects a 180° phase shift in its output to provide, without further phase inverting means, the supplemental overdriving voltage in proper phase to sustain oscillation of Q-1.

The phase-shifting and filter network of subcircuit -D- preferably comprises, in the illustrative embodiment, two adjustable frequency-determining branches or sections, the first of which includes resistors 28, 29, 30 and 31 in conjunction with capacitors 34 and 35, all having parameters and connections, such as illustrated in FIG. 2, to tune this branch for the 45 to 65 Hz. range. The second section of this network comprises resistors 37, 38, 39 and 40, in conjunction with the same capacitors 34 and 35, likewise having parameters and circuit connections as illustrated in FIG. 2 to function in the narrower vernier range covering only 59 to 61 Hz.

Variable resistors 30 and 40 are ganged (along with another variable resistor 68 in subcircuit -F-, as will further appear) for joint operation by a control knob 68A on the control panel depicted in FIG. 7, while the remaining two variable resistors 29 for the 45 to 65 Hz. band, and 38 for the 59 to 61 Hz. band are adjustable only from the rear of the panel for initial calibration of the unit.

The sine wave output of subcircuit -D- is coupled through a load resistor 41 and capacitors 42 and 43 to the input of a special intermediate linear amplifier means, designated as subcircuit -E-, comprising, in addition to the last-mentioned capacitors 42 and 43, another capacitor 44, together with transistors Q-2 and Q-3, resistors 45 through 53 inclusive, and a special gain-controlling photoresponsive resistance means 55 and its associated exciting lamp means 56, said components having parameters and being connected in a circuit configuration such as illustrated in FIG. 2 to effect linear amplification with the gain proportionally regulated by reflex control energy derived from the output of the final power and amplifying means -H- and used indirectly to energize the exciting lamp 56 in a manner such that no voltage or current from the power amplifier is permitted to act in the circuit proper of the intermediate amplifier -E-, whereby spurious oscillation and related feedback complications are eliminated, and the power-amplifying means is in conjunction with other unique characteristics thereof, further alluded to hereinafter, rendered stable and runaway proof.

The regulating ratio of the photoresponsive reflex gain control resistor is chosen preferably to have a 10 to 1 ratio of change in resistance to change in voltage level at the output of the power amplifier so that, for example, a change of 2 percent at the transformer output would be reflected as a 20 percent change in the effective resistance of photoconductive resistor 55. A calibrating resistor 53 (about 17K ohms) provides a sensitivity adjustment in series with the exciting lamp. While interconnecting gain control circuits of conventional type adjust the gain almost instantly, the present indirectly acting reflex gain control affords a wholly satisfactory response time of about one-tenth second and has the advantage of permitting connection of the output of the gain-controlled subcircuit, without danger from some connection which might be tied to a voltage or even to ground.

The output of the intermediate linear amplifier means -E-, derived through coupling capacitor 54 connecting between the emitter of Q-3 and load resistor 52, is employed to drive the phase-shifting means of subcircuit -F-, which comprises a sine-cosine resolver motor having a rotor 60, to which said coupling capacitor is connected, and two stator windings 61 and 62 physically displaced by 90°. The output of the stator winding acts through a network comprising capacitance means 63, an inductive reactance such as a choke 64 (about 50 Hy) and fixed resistance means 65 selectively connectable through switching contacts 66 and 67 to a variable resistor 68 or alternatively to a fixed resistor 69, in series with the second stator winding 62. It is to be observed that variable resistor 68 is ganged with frequency control resistors 30 and 40 of subcircuit -D-, heretofore mentioned as adjustable at the control panel knob 68A, the recited components of subcircuit -E- having parameters and being connected in a configuration, such as depicted in FIG. 2, for rotation of the phase of signals traversing the same continuously through 360°, with the added advantage due to the resolver of rapid manual slewing of the angle to any value of interest by rapid rotation of the rotor through the dial 60A on the control panel.

Closure of one or the other of the selector switch contacts 66 or 67 determines which of the frequency-determining networks, the 45—65 Hz. or 59—61 Hz. ranges, will be effectively in the resolver network, the former band having just sufficient width to require adjustment of the value of resistance 68, which is therefore made variable, whereas the narrower band may be adequately covered by a fixed resistor such as 69, it being observed again that the necessary overall change in resistance values for the two is simultaneously effected for the phase shift network -D- and the phase-rotating means of subcircuit -F- by the aforementioned ganged operation of variable resistors 30, 40 and 68 by panel control 68A. The inductive reactance of choke 64 and the reactance of capacitor 63 constitute an L/C filter means to eliminate distortion and improve the waveform of the signals passed to the input of subcircuit -G-; however, capacitance 63 is also instrumental in the phase-shifting functions of this circuit, and is contrived to keep the reactance closely equal to the fixed resistance 65 in conjunction with the aforementioned selective band-switching operations by selector switch contacts 66 and 67.

Resolver motors of a type utilized in subcircuit -F- are employed principally for servo purposes to produce sine-cosine functions of rotation relative to some analogue; but the presently disclosed utilization of such a device is considered novel in effecting vectorial addition of sine-cosine voltage functions to achieve a proportioned output signal at any phase angle.

The output of the resolver and its associated networks is applied at junction 70 between capacitors 71 and 72 at the input of the driver-amplifier subcircuit -G-, the latter comprising, in addition to said last-mentioned capacitors, resistor means 73, 74, 75 and 76, and a pair of compound-connected transistors Q-4 and Q-5, all having operating parameters and connected in a circuit configuration such as shown in FIG. 2 for linear, class A amplification affording a substantial driving current capable of driving the completely transformer-coupled full-wave power amplifier means -H- to which it is coupled by capacitor means 77 connecting with the junction between the emitter of Q-5 and load resistor 76 for Q-5, and thence via conductor 78 to an upper terminal 81 of the primary winding 80 of power input transformer T-2, returned to ground potential.

The special linear power-amplifying means -H- is characterized by optimum linearity, stability and efficiency and a very substantial output within the frequency range contemplated; and it is considered unique in that it is entirely transformer coupled, omits all biasing networks, and embodies transistors which are compound connected for high current gain in the emitter-follower configuration for linear class-B operation with minimal distortion to supply at least 50 watts of power in an adjustable voltage range at any phase angle in a nearly ideal operative combination with the good regulatory qualities of an autotransformer T-4 providing the continuous voltage variation at the working output, all of which, together with a special oscillation-preventing reflex gain control connection back into the intermediate amplifying subcircuit -E-, results in an unusually high level of stable performance in all operating modes at the low frequency involved, permitting nearly theoretically ideal class-B efficiency in this circuit.

As depicted in FIG. 2, subcircuit -H- comprises, in conjunction with the split secondary windings of the input transformer T-2, first and second pairs of transistors Q-6, Q-7, and Q-8, Q-9, respectively, connected for compound operation for power gain purposes (and which may be of the Darlington type), each pair working in the emitter-follower configuration in the appertaining one of the two side circuits of the full-wave transformer array consisting of the aforesaid split secondary 82 of T-2 and the split primary 86 of the output transformer T-3, connected in a full-wave array depicted in FIG. 2 to be turned on to saturation by signal voltages, and turned off automatically as the result of the forward base to emitter drop of the conductive set of transistors reflected to the nonconducting set as the result of transformer action.

The sine-wave output of the driver amplifier -G- is applied to the primary 80 of the interstage transformer T-2, the secondary 82 of which is connected at its center tap 83 to the negative 60 volt DC terminal of the power supply means -M-, as also is the center tap 87 of the primary of the power transformer T-3, the upper terminal 84 of the secondary of T-2 being connected to the base 90 of transistor Q-6, the emitter 91 of which is connected directly to the base 93 of the companion compound-connected transistor Q-7, while the emitter 94 of Q-7 connects to the upper terminal 88 of the primary of T-3, completing the configuration for the upper branch or side circuit of this symmetrical full-wave arrangement. Transistors of the Darlington type may be employed in the side circuit; and it is further understood that any arrangement of multiple transistors may be used so long as the functions and attributes of the emitter-follower configuration are obtained.

The lower side circuit completing the full-wave amplifying configuration is identical to the upper branch just described in that the T-2 secondary terminal 85 connects to the base 96 of transistor Q-8, the emitter 97 of which is directly connected to the base 99 of its companion compound-connected transistor Q-9, and the emitter 100 of the latter directly connects with the lower terminal 89 of the primary of power transformer T-3. Collectors 92 of Q-6 and 98 of Q-7 are connected in common with the collectors 95 of Q-8 and 101 of Q-9, and all of these commoned collector electrodes are at ground potential at 102, completing the cutoff bias for the sets of transistors.

In addition to its upper and lower terminals 107 and 110, the secondary winding 106 of power transformer T-3 is provided with voltage taps 108 and 109; and said upper terminal 107 connects with a voltage selector switch contact 115 engageable by switch wiper 116 connecting with one terminal 118 of the winding 119 of the voltage variator or autotransformer means -J-. Secondary tap 109 of T-3 connects with another voltage selector switch contact 120 and also said contact 117 associated with the upper wiper contact 116, while the lower T-3 secondary terminal 110 connects with still another selector switch contact 121 adapted to be selectively engaged by wiper contact 122. Said wiper contacts 116 and 122 are ganged for control by panel knob 123 (FIG. 7) and can be shifted between the sets of voltage selecting contacts 115 and 117, and 120 and 121, respectively, to connect the autotransformer winding 119 selectively to higher and lower voltage windings of the secondary 106 of power output transformer T-3.

Still further selective variation of the power output is available by positioning the autotransformer turns-ratio wiper contact 125 by knob 125A on the control panel, said wiper contact connecting through the coil 127 of the circuit breaker means -K- to one of the final output panel terminals 130, the companion terminal 131 of which connects in common to voltage selector contact 121 and lower terminal 110 of T-3, said output terminals 130, 131 being depicted for convenience as the working or test output subcircuit -L- in the block diagram. Thus, the power output transformer has selectable output voltage tap connections to the winding of the autotransformer variator means which, in turn, is further variable by selective positioning of its own turns wiper 125, whereby to afford a wide range of continuous adjustment of the power available at the final output terminals 130, 131, a panel voltmeter 135 being connected across these working terminals ahead of the circuit breaker -K-, and its on-off switch contacts 127X.

The previously mentioned control voltage for the exciting lamp of the reflex gain control means is derived from the upper power transformer terminal 107 and applied via conductor 59 to the sensitivity control resistor 53 which is in circuit with the exciting lamp 56, and via conductors 57A and 57 from the lower transformer terminal 110 to complete the energizing circuit to the exciting lamp 56, for gain control operation in the manner and for the purposes heretofore explained.

Subcircuit -I-, designated as the comparator means, is preferably a conventional synchroscope such, for example, as a General Electric Company type AB18 or AB30 instrument which will include a phase-splitting network 140 connecting with terminals 138 and 139 to the power amplifier secondary conductors 57 and 58, and having an input or exciter coil 141 connecting via conductors 142, 142A and switching contacts 143 to one of the terminals of the A-3 input, and via conductor 145 and switching contacts 144 to the remaining A-3 terminal. A filter consisting of series resistor 146 and shunt capacitance 147 is included in the exciter coil circuit.

An iron vane rotor and pointer means 148 of known type is displaced relative to the scale index to indicate the phase angle in accordance with the resultant field effect upon the moving vane element of the exciter coil 141 and stator coils 149 in the phase-splitting network of the synchroscope. The dial face of the instrument (not detailed) is calibrated for 360° of phase rotation and also in terms of power factor.

Examples are given in the schematic portrayals of FIG. 3 through 6 illustrating the switching interconnections of the various subcircuits and components which are effective in each of the five principal working modes of the apparatus, it being observed that FIG. 3 is used as the basis for all of these views and is illustrative of both modes I and mode II, repetition being avoided in FIGS. 4, 5 and 6 by depicting therein only those changes or additions in the basic arrangement of FIG. 3 necessary to effect the respective transitions to other modes.

As previously mentioned, modes I and II are concerned with phase measurements either with respect to the line voltage as a reference base, or to some other external or generated reference voltage within the overall 45 to 65 Hz. range and connected to input A-3.

Thus, as depicted in FIG. 3, an unknown voltage may be connected to terminals A-2 to energize the primary 12 of the input transformer T-1, the normal contacts 10A of the current test jack being closed at this time, along with switching contacts 11, 14 and 15. The output of secondary winding 13 of T-1 is applied to the input circuit for transistor Q-1 for amplification in subcircuit -C-, and passed through the 59 to 61 Hz. network of the phase-shifting and low-pass filter means of subcircuit -D-, owing to closure of switching contact 27 at this time, the signal being thereafter further amplified by the intermediate amplifier means -E- to drive the resolver in subcircuit -F- and pass the signal on to driver amplifying means -G-, the linear power-amplifying means -H- and variator -J- to the working output terminal -L-, the synchroscope means -I- being available to indicate the phase condition with adjustment as necessary of panel control 68A (for network resistor 40 in subcircuit -D-) and control 60A for the resolver in the phase-shifting circuit -F-. For such a test, the reference voltage for the synchroscope will be the line voltage and frequency derived immediately from input A-3, which in turn derives this line voltage from the line input A-4 cross-connected with A-3 by switching contacts 153 and 154 closed at this time.

It is to be noted here that the line voltage may be connected directly to the input of transformer T-1 by closure of calibration switching contacts 148, 149, for example, in order to bring the synchroscope around to zero phase angle in mode I, these contacts being part of a push-to-test switch means 105 on the control panel, FIG. 7, and ganged with A-2 input contacts 14, 15 to open the latter during such calibration, closure of contacts 148, 149, shunting a calibration coil unit 160, FIGS. 2, 7 and 9, across the input to T-1, said unit comprising a coil 161 of about 3-ampere turns shunted as aforesaid through a resistance 162 of about 750 ohms.

If, instead of voltage, an unknown current is to be tested for frequency and: or phase in mode I, the plug 151 of a current probe 150, such as depicted in FIG. 8, is inserted in the jack 10, constituting input A-1, with the result that the probe coil 152, FIG. 8, is connected in series with the secondary winding 13 of input transformer T-1 to trigger transistor Q-1 in its switching mode derived from the induced sine-wave current picked up by the probe prongs 154 as the result of the unbalanced load afforded across the coil 152, by a diode 155 and its series resistor 156 shunted thereacross, an arrangement which is contrived to produce a flat phase angle error.

Manipulation of the phase shift network frequency adjusting control 68A and resolver control 60A will produce indications of the phase angle and frequency with respect to the line voltage and frequency existing at the special reference input terminals A-3, which in this instance happen to be the line voltage and frequency existing on terminals A-4 by reason of the switching condition previously assumed in this example.

If the foregoing tests are to be performed with respect to some reference voltage or frequency other than that on the line, then the mode switch knob 128 is set for mode II in which the conditions of FIG. 3 are substantially the same as last described with the exception that switching contacts 153—154 are now open and contacts 143 and 144 are closed, thereby disconnecting the A-4 line voltage from input terminals A-3, as in mode I, and applying to the system whatever reference voltage is now to be connected to terminals A-3, the operation of the apparatus being otherwise the same as in mode I.

In order to produce an output at line or supply frequency which can be rotated through 360° of phase angle, mode III is switched in to produce a modification of FIG. 3 to the extent indicated in FIG. 4, according to which switching contacts 25 are closed to connect line voltage from the upper terminal of A-4 through voltage-divider resistors 113 and 114 (FIG. 2) directly to the input to amplifier transistor Q-1, the applied signal being converted to square waveform and passed as before through the 59 to 61 Hz. section of the phase shift network -D-, and thence through the succeeding subcircuits -E- to -L- as in FIG. 3.

To utilize the oscillator mode of subcircuit -C-, according to mode IV, the circuit components of FIG. 3 are again utilized with the changes indicated in FIG. 5, namely, closure of feedback control switching contacts 24, thereby connecting feedback conductor 36 with the input of transistor Q-1 to supply the supplemental overdriving bias necessary to sustain oscillation of the latter in the manner heretofore described, the resultant signals being amplified through the remaining subcircuits -D- through -J- of the system according to the schematic of FIG. 3 for utilization at output terminals -L-, it being observed that in this mode the frequency range will also be 59 to 61 Hz., since switching contacts 27 are closed in this mode also.

Finally, in mode V, the oscillator feedback circuit via conductor 36 continues operative due to closure of contacts 24, but the phase shift network switching contacts 27, according to the modification of FIG. 5, are now opened, and instead contacts 26 are closed to switch in the higher frequency 45 to 65 Hz. section of the network, including resistors 28, 29, 30, 39 and 40, with amplification and phase control in the succeeding subcircuits -E- to -L-, as before. As alluded to in the more detailed description under FIG. 2, the variable resistor 68, ganged with the other panel-controlled variable frequency adjusting resistors, as heretofore explained, is used mainly to balance the bridge circuit which results from the relationship of the phase-shifting resolver means, including windings 61, 62, capacitor 63 and resistor 68 in the wider 45 to 65 Hz. band when switched in at contacts 66 in this mode. It is to be observed also that in this mode V the line input reference voltage from terminals A-4 (switched in substitution for terminals A-3, as explained under mode II) is again supplied as the reference for the synchroscope.

Like the transistor means in the square wave amplifier-oscillator, the transistors in the power amplifier operate in saturation in the switching mode owing to the emitter-follower configuration employed and with similar advantages, as well as others, in that the power amplifier is also independent of temperature and needs no stabilizing means and no critical input parameters as long as the input signals have sufficient voltage to initiate some forward conduction, it being the operation in the case of the power amplifier that the emitter voltage follows the base voltage and automatically establishes the forward voltage conditions for saturating the transistors at each instantaneous value of emitter to collector potential.

Thus, as the input or signal voltage rises in the input transformer, transistor Q-6 for example will be turned on abruptly or switched on, and this action will in turn switch on the companion transistor Q-7 and draw current through the primary of the output transformer T-3, which by transformer action automatically tends to turn off the transistors in the opposite side circuit in a mutually reciprocal cross action which, in conjunction with the zero bias due to return of winding to negative potential at 83 and 87, makes it possible to cut off one set of transistors and turn on the other set by ideal amounts owing to transformer action.

The use of the compound transistor configurations in the power amplifier wherein there is direct connection between electrodes, for example, between the emitter of Q-6 and base of the companion transistor Q-7, favorably affects the power handling capabilities and output in the respect that the full current of the set is delivered to the load along with the current from the preceding stages, such as the driving amplifier, and the full gain potentialities of all of the transistors involved are utilized in that in this configuration the power of all stages is delivered to the load, whereas in other configurations this is not necessarily true.

The advantages of both the square wave, saturation-working amplifier-oscillator and the power amplifier have important application to telemeter practices wherein data and control signals are transmitted to and from control and relay points over tone channels and produce a square wave output which is readily accepted by the input circuit of the amplifier in subcircuit -C- herein. In such operations the phase shift network converts the telemeter signal to a sine wave with a slight phase shift which can be corrected by the phase-shifting resolver and passed through the remaining subcircuits or such of them as may be included in a set which may be used exclusively for telemeter service, and as a matter of option may or may not include the synchroscope and the DC power supply unit adapted to be driven from the service line. In the latter case, the DC bias voltages will usually be supplied by the local 48-volt source. It is found that telemeter channels keyed at 60 Hz. may exhibit a jitter resulting from the interaction between that frequency, the amount of phase shift and the channel frequency, and that such jitter will be integrated by a synchroscope in combination with the phase shift amplifier to provide a steady indication of phase angle, the output under such conditions being a sine wave with approximately 3 percent distortion which is within proper operating limits for a synchroscope.

It is to be understood that modifications may be made in the parameters and form of component parts of the subcircuits without departing from the scope of the disclosure and contemplation of the appended claims, to suit particular applications, frequency ranges, and like operating conditions in which the apparatus is required to work, and that the useful applications and adaptations of the equipment for testing and indicating purposes are not limited to the operating modes described in the illustrative embodiment.

I claim:

1. An electronic system capable of producing an output variable in frequency, phase angle and power, said system comprising: a combination amplifier and oscillator means having bias means for applying a nominal bias thereto, means for applying input signals to said amplifier and oscillator means, a first supplemental bias being supplied by said input signals applying means, said supplemental bias being effective with said nominal bias for overdriving said amplifier and oscillator means to thereby produce a square-wave output, and circuit means including a phase shift network providing a feedback voltage for supplying a second supplemental bias to said amplifier and oscillator means, switching means operative for selectively connecting said amplifier and oscillator means to operate in one of at least two modes, said combination amplifier and oscillator means in a first mode functioning as an amplifier responsive to input signals and said first supplemental bias voltage applied thereto, and said amplifier and oscillator means in another operating mode functioning as an oscillator under influence of said second supplemental bias supplied by the feedback voltage from said phase shift network.

2. Apparatus according to claim 1 further characterized in that said nominal bias is a steady-state voltage below the threshold value of bias voltage necessary to hold the amplifier oscillator means in saturation when turned on to the conductive state, and said supplemental bias applied in either the amplifying or oscillating operation of said amplifier oscillator means is of pulse character.

3. Apparatus according to claim 1 wherein said phase shift network includes impedance components of which at least one is adjustable, the same being connected in a low-pass filter configuration serving to tune the network for operation over a selected frequency range dependent upon the adjustment of the adjustable one of said components, said components and the connection thereof further producing a phase shift of the feedback voltage applied as supplemental bias to sustain oscillation of the amplifier oscillator means.

4. Apparatus according to claim 1 further including resolver means having a resolver motor with a freely rotatable rotor winding to which the sinusoidal output voltage from said network means is applied as an input, together with stator windings disposed in relation to each other and the rotor winding to produce an output voltage which is the resultant of vectorial addition of sine-cosine functions of the input voltage, the phase angle of said output voltage being variable continuously from zero through 360°, and said rotor winding being rapidly rotatable for quick slewing of the phase angle to a desired value.

5. Apparatus according to claim 1 further characterized by the provision of comparator means for displaying a visual indication of the phase angle of the output of said amplifier means, said comparator means comprising a synchroscope having an exciter winding adapted for connection to a source of alternating reference voltage, and a phase-splitting field winding and indicator means displaced by the interacting fields of said windings to indicate phase angle in terms of displacement of said indicator means, said phase-splitting winding being energized from the output of said power amplifier means; said switching means being operable to establish connections between said exciter winding and a plurality of nominal inputs for connection with reference voltage sources.

6. Apparatus according to claim 1 wherein said circuit means includes an intermediate linear amplifier having an output the gain of which is controlled by reflex gain control means comprising a photoresponsive resistance means connected as a load resistor in the output of said intermediate linear amplifier and controlled by exciter lamp means energized by voltage derived from the output of said power amplifier means, said photoresponsive resistance means and exciter lamp means having parameters effective to produce a change in resistance in the photoresponsive resistance means which bears a predetermined ratio of proportionality to said derived voltage such that increases in output voltage of the amplifier means produces a reflex increase in resistance of the load resistance aforesaid, and vice versa, whereby the overall gain of the system is maintained within predetermined stabilizing limits.

7. Apparatus according to claim 1 wherein there is further provided an intermediate linear amplifier operatively interposed between the output of said phase shift network and the input of said resolver means; and a driver amplifier interposed between the output of said resolver means and the input of said power amplifier means; together with comparator means for displaying a visual indication of the phase angle of the output of said power amplifier means, said comparator means comprising a synchroscope having an exciter winding adapted for connection to a source of alternating reference voltage, and a phase-splitting field winding and indicator means displaced by the interacting fields of said windings to indicate phase angle in terms of displacement of said indicator means, said phase-splitting winding being energized from the output of said power amplifier means; together with reflex gain control means comprising a photoresponsive load resistance means in circuit with said intermediate linear amplifier to vary the gain thereof in inverse ratio to voltage changes in the output of said power amplifier means, said photoresponsive resistance means being varied by exciting light from a source energized by output voltage from said power amplifier means, the intensity of illumination from said source varying in proportion with said output voltage.

8. Apparatus according to claim 1 wherein said linear power amplifier means comprises an input transformer and an output transformer respectively having split secondary and split primary windings connected for cooperation to define the opposite half-wave side circuits of a full-wave array, each said side circuit including transistor means operative in saturation and having electrode terminals with the functions and attributes of a base, an emitter and a collector, the emitter and base in each instance being connected in an input circuit in the emitter-follower configuration with one of said split secondary windings, and the corresponding emitter and collector being connected in an output circuit with a corresponding one of said split primary windings, the collector electrodes of transistors in both side circuits being connected in common with a center tap common to the windings of said split secondary winding and a center tap common to the windings of said split primary winding, said commonly connected electrodes being at a potential substantially lower than that of the remaining electrodes, and signal voltage acting in said secondary windings serving when of a magnitude not less than a predetermined minimal voltage, driving the appertaining transistor means into saturation to produce forward conduction current in the corresponding side circuit, said forward current inducing in the opposite side circuit by transformer action a voltage of polarity and magnitude to cut off the appertaining transistor means, such that each side circuit in forward conduction tends to cut off the transistor means of the opposite side circuit in the respective half-wave amplifying operations of the side circuits.

9. A solid-state amplifier/oscillator comprising transistor means capable of operating in saturation and including electrode means having the attributes and functions of a base, an emitter, and a collector, an input circuit including connections with said base and emitter; an output circuit including said emitter and said collector; means applying a nominal bias tending to produce forward conduction but insufficient to effect saturation of the transistor means; first circuit means for applying an input signal to said input circuit such that signal of sufficient magnitude applied thereby and acting in said input circuit provide a supplemental bias driving the transistor means into saturation in the switching mode, said nominal bias being insufficient to maintain saturation in the absence of such supplemental bias; second circuit means connecting with said output circuit to receive amplified signal energy therefrom responsive to operation of the transistor means in saturation as aforesaid; means in said second circuit means for shifting the phase of said amplified signal energy therein by a predetermined amount to an in-phase relationship with the forward conducting conditions of said transistor means to sustain a condition of oscillation of the latter; and means operable to connect said first circuit means or said second circuit means selectively with said input circuit, whereby the transistor means is operated in the amplifying mode or the oscillating mode.

10. In a low frequency test circuit having input circuit means adapted for connection with AC voltage, current, frequency and power sources, the combination of: subcircuits and interconnecting means including mode switching means conditioning the same for operation in selectable operating modes, said subcircuits including at least a first subcircuit comprising a combination amplifier and oscillator embodying transistor means operative in the switching mode to produce a square-wave output in both the amplifying and oscillating modes thereof; a second subcircuit including adjustable frequency-determining means and circuit components operative to convert the square-wave signal energy of the first subcircuit to sine-wave form having a phase relation to the conductive states of said transistor means capable of sustaining oscillation of the latter at selectable frequencies within a range responsive to energization thereof by feedback from the output of the second subcircuit to the input of the first subcircuit; a third subcircuit including phase-rotating means operative to rotate the phase of output from the second subcircuit from zero to any angle within and through more than two quadrants; and a fourth subcircuit including a full-wave linear power amplifier having transformer means defining half-wave half-wave side circuits each embodying transistor amplifying means connected in the emitter-follower configuration and operating in saturation in a mutually cross-biasing action such that a predetermined minimal forward conduction current of the transistor means in one side circuit induces a cutoff bias in the opposite side circuit operable to cut off the transistor means therein; and utilization output circuit means to which the full-wave output of said power amplifier is delivered; said selectable operating modes including at least one in which the first subcircuit operates in the amplifying mode with respect to a selected one of said input circuit means; and further modes in which the first subcircuit operates in the oscillating mode in at least two frequency ranges determined by frequency adjustment in the second subcircuit; and at least one further mode in which the phase angle of energy from the second subcircuit is shifted with respect to the angle of a reference signal at a particular one of said input circuit means.

11. A combination amplifier and oscillator means having an input circuit and an output circuit; means applying a nominal bias to said amplifier and oscillator means tending to produce conduction but insufficient to effect saturation of said amplifier and oscillator means; first circuit means for applying an input signal to said input circuit such that signals of sufficient magnitude provide a supplemental bias for driving said amplifier and oscillator means into saturation, second circuit means connecting with said output circuit to receive amplified signal energy therefrom responsive to operation of the amplifier and oscillator means in saturation; means in said second circuit means for shifting the phase of said amplified signal energy by a predetermined amount to sustain a condition of oscillation in said amplifier and oscillator means; and means operable to connect said first circuit means or said second circuit means selectively with said input circuit, whereby the amplifier and oscillator means is selectively operated in an amplifying mode and an oscillating mode.

PO-1050
(5/69)

UNITED STATES PATENT OFFICE
CERTIFICATE OF CORRECTION

Patent No. 3,594,637      Dated July 20, 1971

Inventor(s) Robert W. Beckwith

It is certified that error appears in the above-identified patent and that said Letters Patent are hereby corrected as shown below:

Column 4, Line 66, after "two", insert --ranges--.

Column 12, Line 19, "half-wave" should be removed.

Signed and sealed this 4th day of January 1972.

(SEAL)
Attest:

EDWARD M. FLETCHER, JR.
Attesting Officer

ROBERT GOTTSCHALK
Acting Commissioner of Patents